United States Patent [19]

Hitchcock

[11] Patent Number: 5,050,207
[45] Date of Patent: Sep. 17, 1991

[54] PORTABLE AUTOMATED TELLER MACHINE

[75] Inventor: Roger C. Hitchcock, Southboro, Mass.

[73] Assignee: National Transaction Network, Inc., Hudson, Mass.

[21] Appl. No.: 431,524

[22] Filed: Nov. 3, 1989

[51] Int. Cl.$^5$ ............... H04M 11/00; G06K 5/00; G06F 15/00; G07G 1/14
[52] U.S. Cl. .......................... 379/96; 379/98; 379/110; 379/144; 364/406; 235/382; 902/22; 902/24
[58] Field of Search ............ 235/382, 379; 902/8, 902/22, 24, 28, 1; 364/401, 406, 408; 379/90, 91, 95-99, 110, 144, 185, 442-444

[56] References Cited

U.S. PATENT DOCUMENTS

| | | | |
|---|---|---|---|
| 3,976,840 | 8/1976 | Cleveland et al. | 379/96 |
| 4,018,998 | 4/1977 | Wenger | 379/433 |
| 4,068,095 | 1/1978 | Ghormley et al. | 379/444 |
| 4,162,373 | 7/1979 | Ingber | 379/444 |
| 4,288,659 | 9/1981 | Atalla | 235/379 |
| 4,317,957 | 3/1982 | Sendrow | 902/5 |
| 4,484,306 | 11/1984 | Kulczyckyj et al. | 364/900 |
| 4,536,647 | 8/1985 | Atalla et al. | 235/379 |
| 4,587,409 | 5/1986 | Nishimura et al. | 902/22 |
| 4,599,491 | 7/1986 | Serrano | 379/444 |
| 4,652,698 | 3/1987 | Hale et al. | 902/1 |
| 4,654,482 | 3/1987 | DeAngelis | 379/91 |
| 4,679,236 | 7/1987 | Davies | 380/23 |
| 4,689,478 | 8/1987 | Hale et al. | 379/96 |
| 4,734,858 | 3/1988 | Schlafly | 364/408 |
| 4,815,031 | 3/1989 | Furukawa | 364/900 |
| 4,839,504 | 6/1989 | Nakano | 235/379 |

OTHER PUBLICATIONS

Harris Dracon Division, "Terminal System 24", *Telephony*, Sep. 19, 1988, pp. 24, 25.

*Primary Examiner*—Jin F. Ng
*Assistant Examiner*—Wing F. Chan

[57] ABSTRACT

The portable automated teller machine disclosed by the present invention is a low-cost, pocket-size data terminal which can securely exchange information with a host bank computer. It is battery powered, operates without the need for direct connection to a telephone line and couples to the host bank computer via the telephone handset of any public or private telephone station. It allows its user to securely access bank and bank accounts and to securely effect either interaccount transfers or bill payments. Security is assured by assigning a PIN to each individual user and prestoring it therein, by assigning a machine identity number to each machine and storing it therein, and by providing encrypted data communication. It has prestored therein the individuals account numbers and the phone numbers and other parameters needed for communication to the corresponding host computer bank. It features foldable telephone receiving ears pivotally mounted to a housing member, and an overlayed touch screen mounted flush with the housing member. A calculator function is also provided.

22 Claims, 11 Drawing Sheets

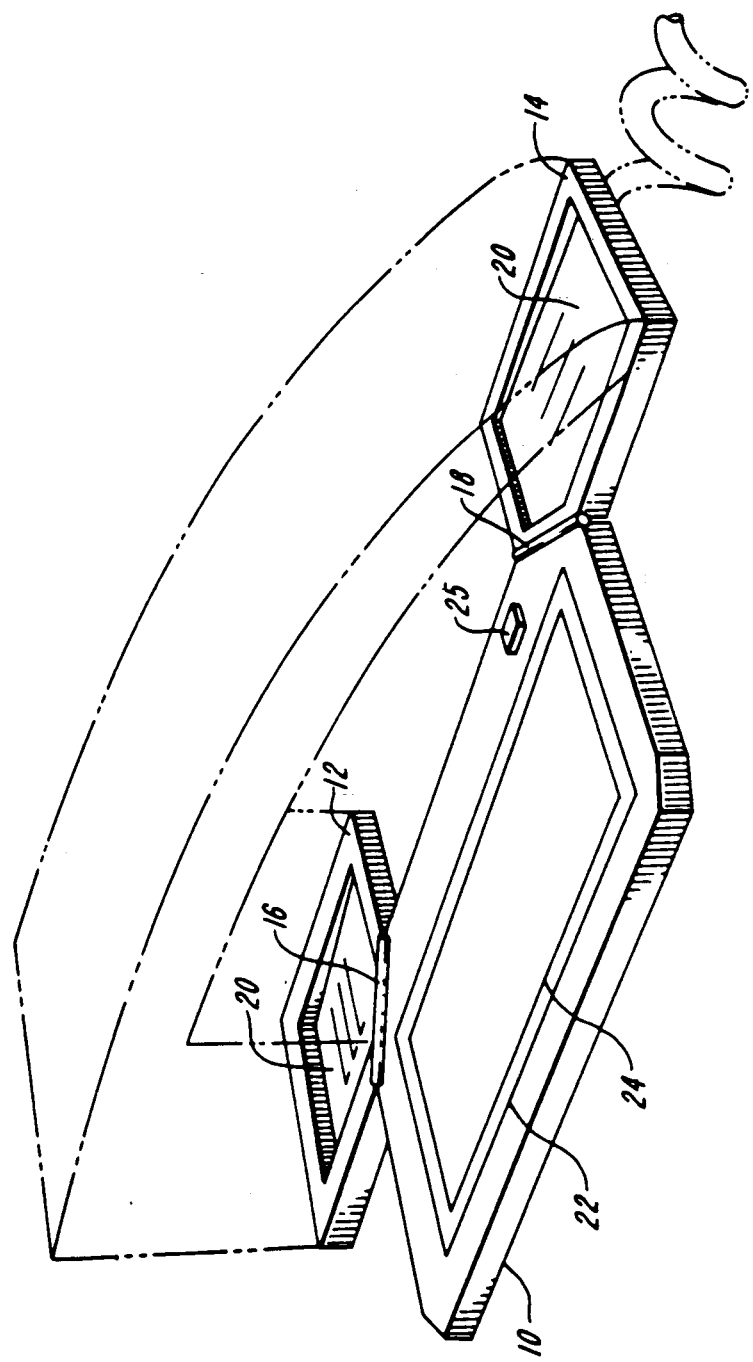

FIG. 11

PROMPT SCREEN

PLEASE SELECT ACCOUNT

CHECKING: 6556324

SAVINGS: 5665778

OTHER:

HOME

ACTION: PRESS "CHECKING" BOX

PLEASE SELECT ACCOUNT

CHECKING: 6556324 ✓

SAVINGS: 5665776 ?

OTHER: ?

HOME

FIG. 12

PROMPT SCREEN

PLACE PHONE AS SHOWN:

SELECT PHONE #

555-1234 ?

1-800-555-1234 ?

HOME

FIG. 13

ACTION: PLACE HANDSET, PRESS "LOCAL" BOX

PLACE PHONE AS SHOWN:

SELECT PHONE #

555-1234 ✓

1-800-555-1234 ?

HOME

PROMPT SCREEN

SELECT BILL PAYMENT

PACIFIC BELL

PG&E

OTHER

HOME

FIG. 20

ACTION: PRESS "PACIFIC BELL" BOH

SELECT BILL PAYMENT

PACIFIC BELL ✓

PG&E ?

OTHER ?

HOME

FIG. 21

PROMPT SCREEN

ENTER AMOUNT
PRESS ENTER 7 8 9
4 5 6
1 2 3
ENTER CL 0 .

FIG. 22

ACTION: PRESS AMOUNT, THEN "ENTER"

$52.13
PACIFIC BELL 7 8 9
4 5 6
1 2 3
ENTER CL 0 .

PROMPT SCREEN

```
PLEASE WAIT...

YOUR TRANS INFO

IS BEING

RETREIVED
```

FIG. 23

ACTION: WAITING, THEN HANGING
RECEIVER, PASSING "OK" BOH

```
DATA RETRIEVED

PLEASE HANG UP

PRESS OK TO

REVIEW INFO                [OK]
```

FIG. 24

PROMPT SCREEN

```
    PROCESSING COMPLETE      [OK]

PACIFIC BELL

PAYMENT               CALC
    ┌─────────────┐
    │      52.13  │         ▲
    └─────────────┘       _HOME
```

PORTABLE AUTOMATED TELLER MACHINE

FIELD OF THE INVENTION

This invention relates to data terminals, and more particularly, to a secure, portable automated teller machine for communication with a remote bank computer system over the public telephone network.

BACKGROUND OF THE INVENTION

Data terminals are employed in a variety of contexts to provide information to a remote host computer, and to receive data from or exchange data with the remote host computer or other communicating device. Such data terminals are configured in one of a stand-alone mode, where access to the host is established over the public telephone network, and in a cooperative mode, where access to the host is established over a private, dedicated communication network.

Host computer access by both types of data terminals is a factor of major concern. The confidentiality and integrity of the processed and/or stored information needs to be protected, and the risk of malicious manipulation and/or theft or misuse of products or financial instruments must be minimized if not altogether eliminated.

For the stand-alone configured variety of data terminals, they are generally of a desktop size and include a keyboard for data entry, a display screen for display of messages and data, and operating controls as well as communications devices to permit the exchange of data with the host computer. Data terminals of this type can be configured in a portable container, which is usually of a briefcase size, so that access to a remote host from virtually any telephone connected in the public telephone network is possible. The heretofore known prior art security techniques for remote data terminals via the telephone network, as exemplified by U.S. Pat. Nos. 4,679,236, 4,815,031, 4,484,306, and 3,976,840, each incorporated herein by reference, generally limit access to the host computer to a class of users who either are privileged with a password, or who have a pre-established phone number, such that the host computer calls back the data terminal to confirm that it is a valid data terminal. The pre-established phone number call-back security technique is limited to one permanent location, where the portable terminal may be connected, so that password oriented security is the only known technique for controlling access to the remote host computer from any general telephone on the public telephone network from the heretofore known stand-alone data terminals.

In the other mode, where a private network of cooperative data terminals has been installed, security is assured, in part, because of the private connection with the host computer via the dedicated communications network. Automated bank teller terminals and airline reservation terminals are examples of such cooperative mode data terminals.

Security is further assured for access by automated teller machine cooperative mode data terminals to a remote host bank computer by a magnetic stripe card which has the customer's account number and a Personal Identification Number (PIN). The magnetic card is entered to the terminal, which reads the encoded PIN, and the PIN is manually entered to the keyboard of the automated teller machine. So long as there is a match therebetween, the user is free to access his personal account from any network terminal. The utility of such private networks of data terminals, although they are reasonably secure, is limited insofar as one such automated teller machine must be sought out before access can be gained to the remote bank computer.

There are a multitude of financial and other transactions which could be conducted electronically via the public telephone network with stand-alone data terminals, provided, among others, that security like the security of the cooperative-mode data terminals is able to be provided. For instance, a stock purchase, or sale, could be authorized electronically, or a purchase order for goods to be delivered could be authorized electronically. But failing being physically present at a network terminal for a secure connection to the host computer, only a stand-alone portable data terminal with limited security could heretofore be used to gain access to the host computer via the public telephone network. And for those who do not want to be physically encumbered with a briefcase size programmable data terminal, it was not heretofore possible to gain such access.

SUMMARY OF THE INVENTION

It is therefore an object of this invention to provide an apparatus which provides secure access to a host computer from any public telephone point for the purpose of authorizing a transaction or for verifying an accounts' status.

It is also an object of this invention to provide bimodal communication between the portable terminal and the host computer in a manner that minimizes connection time and thereby maximizes security.

A further object of this invention is to provide a secure means for the host computer to communicate sensitive data to a remote terminal which is authorized to receive such data over public telephone lines.

A further object of this invention is to provide a data entry terminal that is transportable in a shirt pocket.

It is a further object of this invention to make the data terminal itself be the security instrument, the operation of which is possible only by the authorized person.

In accordance with these and other objects, the present invention provides a stand-alone portable data terminal which is especially for use as a personal teller machine for banking transactions, which is wholly self-contained, which provides secure data and command entry and display functions, and which reliably and securely exchanges data with a remote bank computer system using any telephone handset over the public telephone network. In a preferred embodiment, the terminal has a housing of wallet-like configuration having hinged ears which open along respective diagonal axes to an open position in which the ears are cooperative with a telephone handset placed thereon to provide acoustic coupling to the telephone line for communication with a host bank computer. The ears include an audio transmitter and an audio receiver for coupling to the earpiece and mouthpiece, respectively, of the telephone handset. The housing also includes a screen for message and data display and a touchscreen overlying the display area thereof for data and command entry. A single-chip integrated circuit carried by the housing has a processor and at least three memories cooperative to provide form-based screen displays, and corresponding touch screen configurations, as well as bimodal operation in an off-line mode for data entry and security confirmation and an on-line mode for communication with the remote host bank computer and for security confirmation. In the memories are prestored the bank account numbers of each individual, the telephone number(s) of the host bank computer, and an auto-dialer tone generator function preferably implementing a 103 modem format. A calculator function in addition is provided in the preferred embodiment. The single-chip integrated circuit is powered by a long-life battery carried by the housing to provide prolonged usable operating lifetime without need for battery change.

In the off-line mode, security is provided by a personal identification number that is prestored in one of the memories of the single-chip integrated circuit for each user and is personalized for that user to permit secure access to his or her bank accounts and to permit banking transactions only by that user. The terminal is operated only by the authorized user and in the off-line mode to provide data set-up. After data set-up has been completed in the off-line mode, the transaction is implemented in the on-line mode, whereby, the interconnect time with the bank computer is minimized, which thereby maximizes the security of the transmission between the terminal and bank computer as well as minimizes the time and cost of the transmission itself.

In the on-line mode, security is provided by a machine identification number (MIN) that is prestored in one of the memories of the single-chip integrated circuit for each machine and is individualized for each machine to permit secure access to the host bank computer only by machines that are authorized machines. The portable data terminal in this way is itself a security instrument in the on-line mode. In the preferred embodiment, data previously entered in the off-line mode is transmitted to and data is received back from the host bank computer in an encrypted format, which further enhances transmission security.

The portable automated banking machine of the present invention weighs about eight ounces, and is readily carriable in any garment pocket, such as in a shirt, coat or dress pocket, as well as in any portable container, such as in a briefcase or pocketbook. The portable automated banking machine is usable with a telephone handset located at any public or private telephone station.

In the preferred embodiment, a switch responsive to the ears being in their open condition places the portable automated banking machine in its off-line mode for data set-up, and for valid PIN security authorization. With the receipt of the telephone handset located at the telephone station onto the unfolded ears, the portable automated banking machine is placed in its on-line mode for communication with the bank through its host computer, such as for account balance inquiries and electronic funds transfer between accounts, and, among others, bill payments, and for valid MIN security authorization. Upon completion of one or more transactions, the communication link is disconnected and the portable automated teller machine is again placed in its off-line mode. Data representative of the just completed transaction is displayed. Thereafter, the telephone handset is replaced onto its cradle, the ears are folded, and the portable automated teller machine is returned to a pocket, purse, briefcase or the like.

BRIEF DESCRIPTION OF THE DRAWINGS

The invention will be more fully understood from the following detailed description taken in conjunction with the accompanying drawings, in which:

FIG. 3 is a perspective view of the portable automated teller machine in its open position and shown coupled to a telephone handset;

FIG. 6 is a diagram of the communications protocol illustrating the off-line and on-line operational modes of the automated teller machine of the instant invention;

FIGS. 7 through 27 depict various prestored screen displays provided on the display screen of the machine in the course of selected solely exemplary transactions.

DETAILED DESCRIPTION OF THE INVENTION

Figure 2:
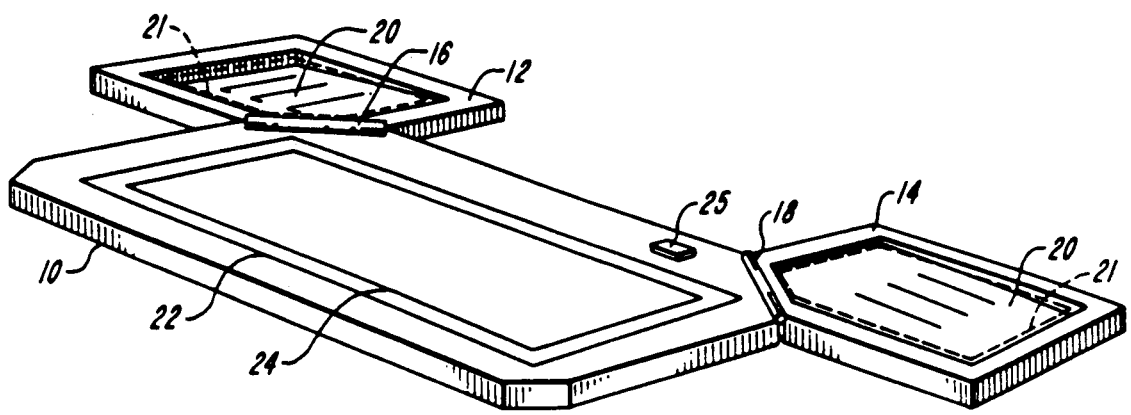
FIG. 2 is a perspective view of the portable automated teller machine of FIG. 1 and shown in its open position.
Figure 1:
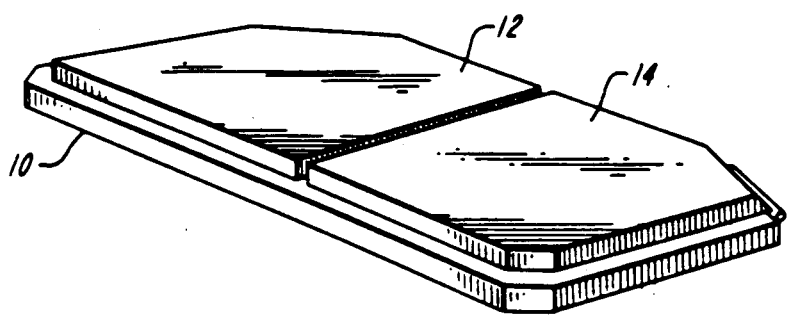
FIG. 1 is a perspective view of the portable automated teller machine in accordance with the invention and shown in its closed position.

A preferred embodiment of a portable data terminal especially for use as a personal teller machine for banking transactions is shown in perspective view in FIGS. 1, 2, and 3. The automated teller machine includes a housing 10 of small wallet-like size which is readily carried in a user's pocket or purse and which is a wholly self-contained functional data terminal.

The housing 10 includes two hinged ears 12 and 14 which open along respective diagonal axis 16 and 18 to an open position as shown in FIG. 2. The ear 12 includes an audio transmitter typically a piezoelectric transmitter, and the ear 14 includes an audio receiver typically an electret microphone. The ears, in their open position, are dimensioned and spaced to accommodate the handset of a conventional telephone, with the earpiece of the handset engageable with ear 14 and the mouthpiece of the handset engageable with ear 12. The ears are thereby acoustically coupled to the telephone handset to provide data communication via the public telephone network to a host computer at the user's bank. The surfaces 20 of the ears are inclined outwardly and downwardly, as shown in FIGS. 2 and 3, to accommodate the inclination of the earpiece and mouthpiece of the telephone handset.

The top surface of the housing 10 includes a display 22 having a touch screen 24 laid thereover to provide data and command entry to different portions of the display 22. The display 22 provides data and message display, during terminal operation.

A switch 25 (FIG. 2) turns the portable automated teller machine on and off. In an alternative embodiment, the switch may be recessed within the housing in position to cooperate with the pivoting movement of one of the ears 12, 14 to turn the portable automated teller machine on and off in response to the position of the selected one of the ears being either in its open or in its closed position. The terminal is powered by long life batteries, not shown, such as lithium cells, contained within the housing 10. The display 22 preferably is a liquid crystal 100×400 dot graphic display, and the touchscreen 24 preferably is a 32 sensor pad touch sensitive matrix disposed on the surface thereof for data and command entry.

In a typical implementation, the housing, when closed, is 4.5 inches long, 2.75 inches wide and 0.5 inch high. The housing is typically molded of a plastic material, such as ABS. The surfaces 20 of the ears on which the handset rests may be rubberized as schematically illustrated in dashed outline 2 to provide a non-slip mounting surface and acoustic coupling for the telephone handset. Other ways for providing coupling between the handset and the ears, including other acousto-mechanical couplers and/or electronic error detecting encoders, or other signal discrimination techniques, may be employed without departing from the inventive concept.

Figure 4:
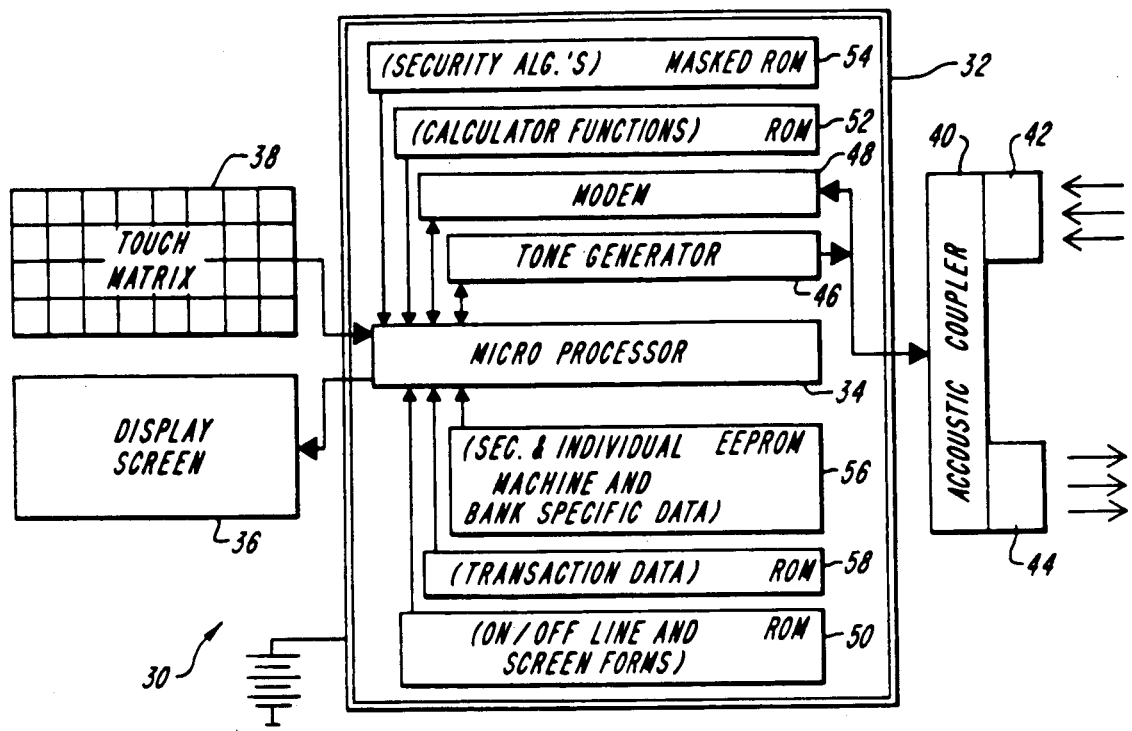
FIG. 4 is a block diagram of the portable automated teller machine.

Referring now to FIG. 4, generally shown at 30 is a block diagram of the portable automated teller machine of the present invention. A single-chip integrated circuit is shown schematically as a double-lined box 32.

The single-chip integrated circuit 32 includes a microprocessor 34. A display screen 36 is operatively coupled to the processor 34 of the single-chip integrated circuit 32, and a touch screen 38 is operatively coupled to the processor 34 of the single-chip integrated circuit 32. The touchscreen 38 overlays the display screen 36. For each screen-form to be described displayed on the display screen 36 by the processor 34, the touchscreen 38 is configured by the processor 34 to allow appropriate data and command entry to the corresponding part of the particular screen-form being displayed on the display screen by the processor 34.

An acoustic coupler 40 having a microphone 42 and a speaker 44 is operatively coupled to the processor 34 via a tone generator 46 and a modem 48, preferably implementing a BELL 103 format. The tone generator 46 and modem 48 are operatively coupled to the processor 34. The tone generator 46, resident in the single-chip integrated circuit 32, initiates the link-up with the host bank computer in a manner to be described. The modem 48, resident in the single-chip integrated circuit 32, implements asynchronous data transmission and reception in a manner to be described between the processor 34 and the host bank computer located at the bank where the user has his/her bank accounts.

A first memory 50 is resident in the single-chip integrated circuit 32. The memory 50 is connected to the processor 34 thereof as a read only memory (ROM), and the memory locations thereof contain the code that implements operation in an on-line mode and an off-line mode, both to be described, of the portable automated teller machine of the invention, contain the code that implements the several screen-forms to be described with which the processor 34 drives the display screen 36, as well as the code that configures the touchscreen 38 in formats that respectively conform to the several screen-forms to allow data and command entry.

A second ROM memory 52 is resident in the single-chip integrated circuit 32 and operatively coupled to the processor 34. The ROM 52 memory locations have the code that implements a calculator function when the portable automated teller machine is user-selected for operation in its calculator mode.

A third ROM memory 54 configured as masked ROM is resident in the single-chip integrated circuit 32 and operatively coupled to the microprocessor 34 thereof. The masked ROM 54 memory locations have stored therein the code that implements encrypted data transfer whenever the portable automated teller machine is selected for operation in its on-line mode. The encryption preferably implements DES encryption algorithms and key codes. In the presently preferred embodiment, the memory 54 is fabricated in lower lying layers of the single-chip integrated circuit 32, so that any attempt to tamper with the chip in an effort to uncover the DES algorithms results in a destruction of the chip rather than the unauthorized reading of the encryption codes.

An electrically erasable programmable read only memory (EEPROM) 56 is resident in the single-chip integrated circuit 32 and operatively coupled to the processor 34 thereof. The EEPROM 56 contains the memory locations where each portable automated machine is particularized individualwise and bankwise. The memory 56 locations have prestored therein the personal identification number (PIN) of the individual to whom the portable automated teller machine is dedicated, the particular machine identity number (MIN) that uniquely identifies each portable automated teller machine as an authorized portable automated teller machine, the particular telephone number(s) of the specific bank at which the individual to whom the portable automated teller machine is dedicated has chosen as its bank, the keys used by the encryption algorithms, and the specific account numbers maintained by that particular individual at that particular bank. Preferably, the PIN of a specific individual is stored in an encrypted format in the memory 56.

A random access memory (RAM) 58 is resident in the single-chip integrated circuit 32 and operatively coupled to the processor 34 thereof. The RAM 58 provides the memory locations where the transaction data is temporarily stored during set-up in the off-line mode, and where data is transferred blockwise to the host computer during operation in the on-line mode. The memory 58 memory locations also receive any data supplied in response back from the host computer which data is representative of status of the transaction transacted by the individual user. The RAM 58 also provides a scratch-pad during operation in the calculator mode. The RAM 58 is preferably battery protected, so that the data stored therein is saved during power-on and power-off cycling.

In the preferred embodiment, the single-chip integrated circuit 32 described above is available as a custom chip to specification from Sierra Semiconductor, Inc. of 101 Cambridge Street, Burlington, Mass. 01803.

Figure 5:
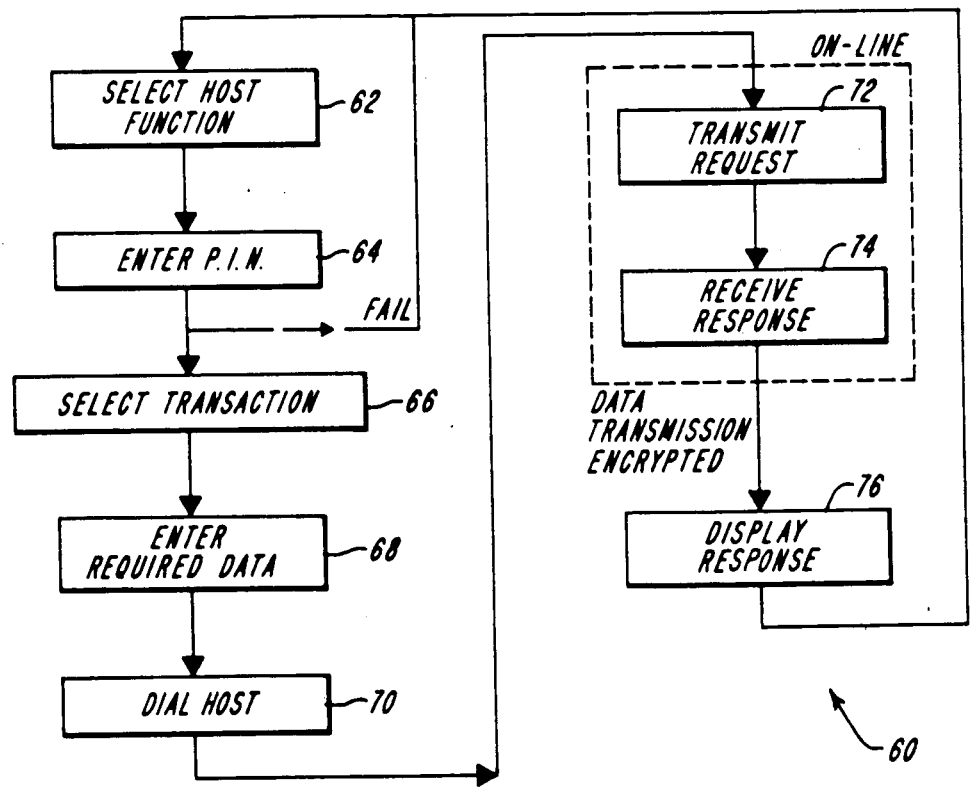
FIG. 5 is a processing flow chart of the portable automated teller machine of the instant invention.

Referring now to FIG. 5, generally designated at 60 is a processing flow chart illustrating the operation of the portable automated teller machine of the instant invention. With the ears of the housing being deployed in their open condition, the portable automated teller machine is caused to assume operation in its off-line mode by activating the on/off switch and, as shown by a block 62, the display is driven to display a selection screen-form to enable the user to select operation either as a calculator, or as a portable teller machine. If operation in the calculator mode is selected, the display is driven to present a calculator screen-form, and the touch screen is correspondingly configured to implement the corresponding calculator command and data entry functions to the screen-form.

As shown by the block 64, if the automated teller machine mode has been selected, the screen and touch screen are driven and configured to present a screen-form requesting that the personal identification number of the user be entered. If the PIN is not entered, or incorrectly entered, processing returns to the block 62.

If there is a correct match between an entered PIN and the prestored, encrypted PIN in the memory 56, (FIG. 4), the display and touch screen are driven and configured to present a screen-form asking the user to select an intended transaction from among bill paying, account inquiry, or account transfers, as shown by a block 66.

As shown by a block 68, the display screen and touch screen are so driven and configured in response to a specific transaction selection to present a screen-form that corresponds to that specific transaction to enable data and command entry to the screen.

As shown by a block 70, upon data and command entry the screen and touchscreen are driven and configured to present a screen-form that requests the user to place the telephone handset onto the unfolded ears. The portable automated teller machine is responsive to the dial tone of the telephone handset having been placed upon the ears in their unfolded condition to assume operation in its on line mode. It then activates the autodialer 46 (FIG. 4) and dials the telephone number stored in the EEPROM 56 (FIG. 4) to establish a telephone communication link with the host bank computer as shown by a block 70.

As shown by blocks 72, 74, in the on-line mode, the processor transmits via modem 48 (FIG. 4) the block of transaction data stored in the RAM 58 during operation in its off-line mode to the host bank computer over the public telephone network, and receives back from the host bank computer data representative of the completed transaction and stores it back in the RAM 58 (FIG. 4). Operation in the on-line mode is conditioned in the preferred embodiment on having confirmed a valid MIN, in a manner to be described.

As shown by a block 76, upon the disconnection of the communication link, the display screen and touch screen are driven and configured to display any data representative of transaction status that may have been downloaded by the host computer into the RAM 58 (FIG. 4), and processing returns to the block 62.

Figures 6, 7:
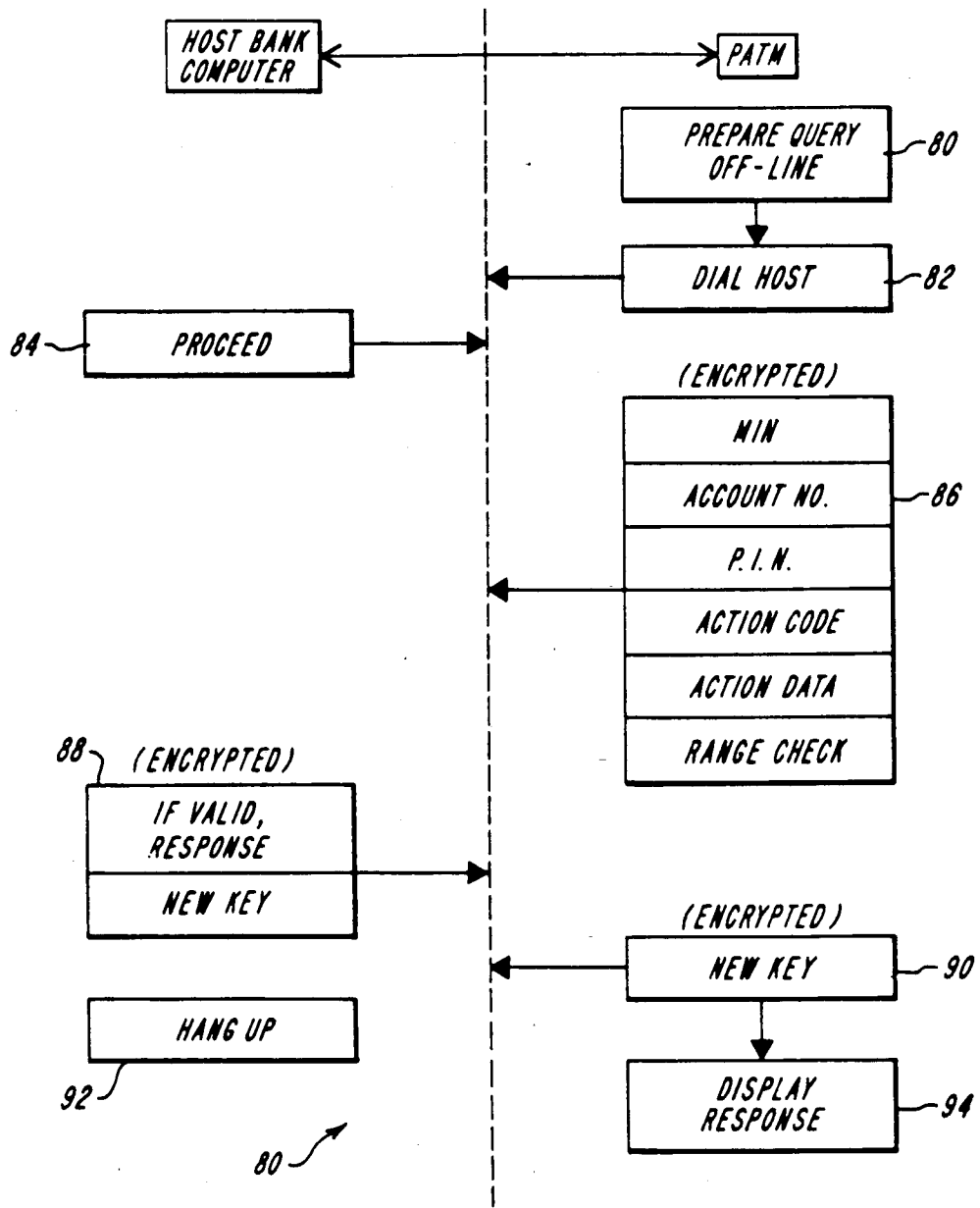

The protocol of communication between the portable terminal and a remote computer illustrating the off-line and on-line operational modes of the portable automated teller machine of the instant invention is shown at 80 in FIG. 6. For a given transaction, as shown by a block 80, data set-up is provided during operation in its off-line mode, and, based on a predetermined plurality of screen-forms displayed in a preselected sequence on the display screen in a manner to be described, a user provides data and command set-up to effect an intended transaction As shown by a block 82, after data and command set-up, the screen and touchscreen are driven and configured to prompt the user to place the telephone handset onto the unfolded terminal ears. A dial command received through the ears causes the tone generator to provide dialed access to the remote bank computer.

As shown by a block 84, the remote computer answers, and links up with the portable automated teller machine via a telephone line communication link. As shown by a block 86, the data set-up in memory during operation in the off-line mode is transmitted blockwise to the bank host computer via the modem over the telephone communication link. The transmission of the data blockwise in the preferred embodiment is encrypted using a selected encryption key stored in memory. The block of set-up data stored in the RAM 58 for that transaction includes the machine identification number (MIN), the selected account number, the personal identification number (PIN) of the user, an action code representative of the type of transaction selected, action data representative of any quantitive and other selections relative to the transaction selected, and a range check.

As shown by a block 88, the host computer performs security authorization, and upon confirmation of a valid received MIN, it allows its database to be accessed for processing of the particular transaction. Upon having effected the intended transaction, the host bank computer supplies data back to the processor using a new key.

After receipt in the new key as shown by a block 90 of the data supplied by the host bank computer, the host bank computer "hangs-up" as shown by a block 92, and the terminal returns to its off-line mode. The data supplied by the bank computer representative of the status of the particular transaction is then displayed off-line as shown by block 94.

In the off-line mode, the terminal can also provide calculator functions for the convenience of the user. A primary application of the portable terminal is for user inquiry to his or her bank for current activity and balances and for non-cash transactions in a secure and reliable manner, although other operational modes and applications are possible without departing from the inventive concept.

Figure 8:
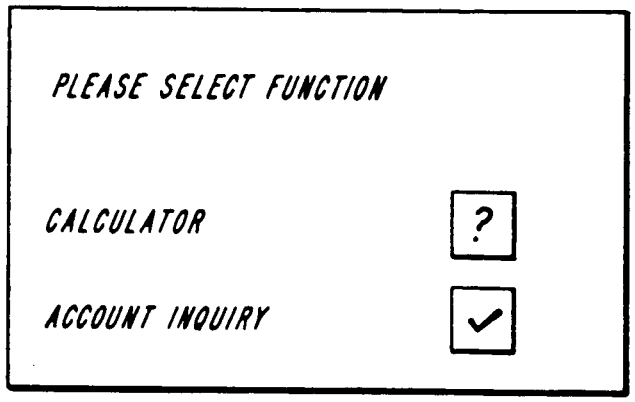
Figure 9:
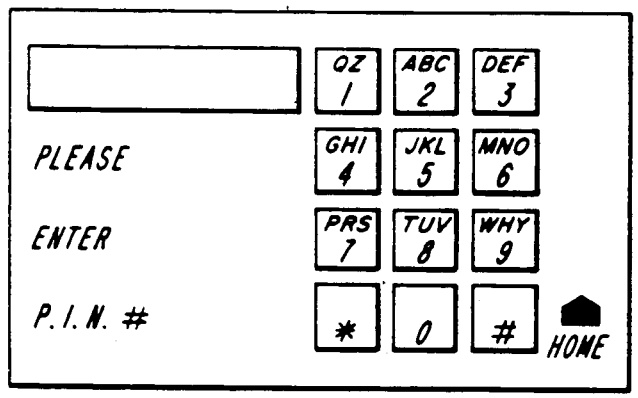
Figure 15:
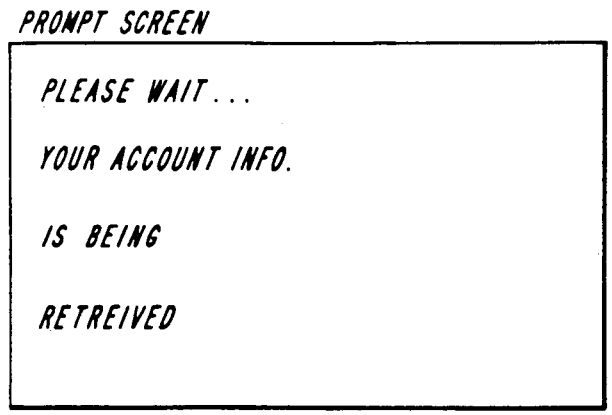
Figure 16:
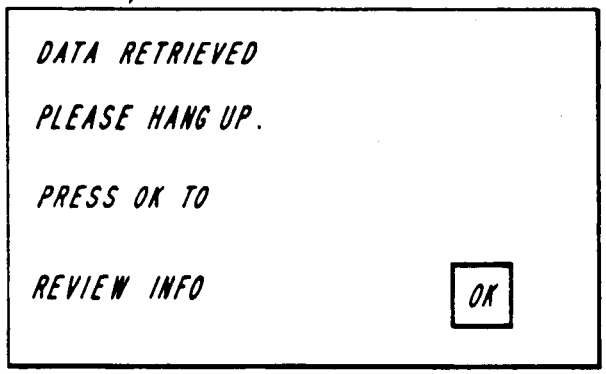
Figure 17:
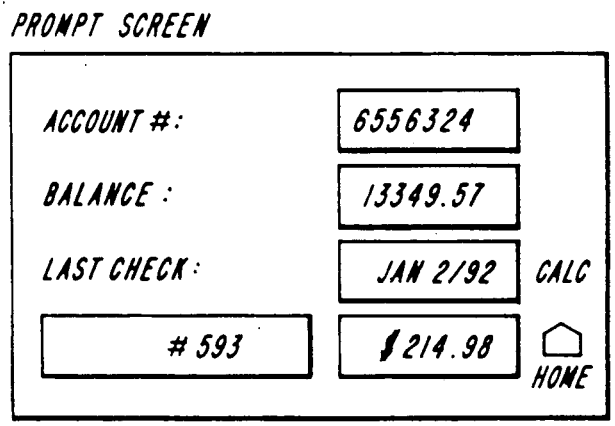

A typical operating sequence is described in conjunction with FIGS. 7 through 17, which depict the presently preferred screen displays and display sequence of the portable automated teller machine of the present invention for user account status inquiry. The initial prompt screen is shown in FIG. 7 and requests the user to select a calculator function, an account inquiry, or a bill payment. Upon selection to the display by touching the same of the account inquiry option the displayed question mark is replaced by a check mark as shown in FIG. 8, following which the prompt screen of FIG. 9 is displayed, requesting entry of a PIN. In these and subsequent screen displays the home prompt can be actuated to return to the initial prompt screen of FIG. 7. Entry is accomplished via the touch sensitive keypad displayed on the screen. Upon entry of the PIN number at the corresponding display area as indicated by asterisk in FIG. 10 or other suitable character, the entry of the PIN number is accomplished without displaying the actual number for security purposes. After entry of a valid PIN number, the screen of FIG. 11 is shown requesting selection of checking account, savings account or "other" banking service. Upon selection of the checking account, for example, the screen display of FIG. 12 is shown, and the screen of FIG. 13 then appears. The user is instructed thereby to select the phone number to be dialed. Upon selection of a phone number to be dialed, as shown in FIG. 14, the terminal dials the number to access the remote bank computer, during which time the screen of FIG. 15 is shown to indicate that the computer is retrieving the account information. Next, the screen of FIG. 16 is shown to indicate that data has been retrieved and stored in the memory of the portable terminal. The user is requested to hang-up, and to press the "OK" button to review the retrieved information. The information then appears as shown in the display of FIG. 17. The account number, the current balance, the date of the last check and the number and amount of that check are displayed. On this screen, the user can select the calculator function, or return to the home or initial screen.

Figure 18:
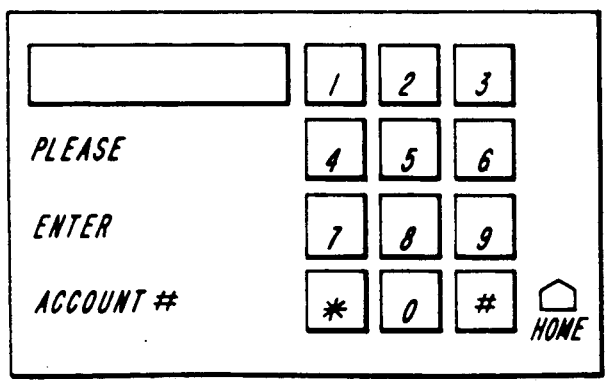

If the "other" key of the screen display of FIG. 11 had been actuated, the screen of FIG. 18 would have been shown, which requests entry of a user account number which is other than those already prestored in one of the memories of the terminal. The entry sequence then continues in a similar manner to that described above, and this sequence, as well as the sequence for the "saving" option, are not separately described for the sake of brevity of explication.

Figure 10:
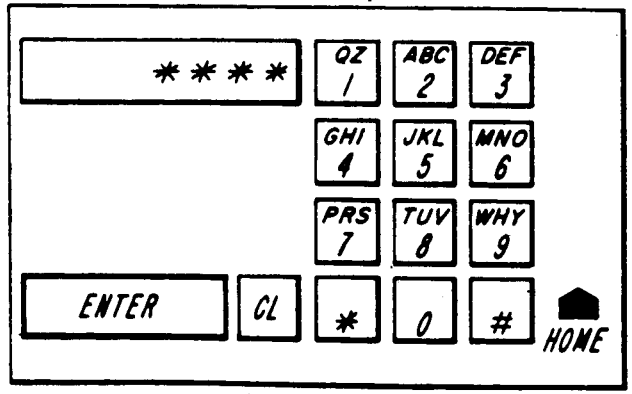

The portable automated teller machine of the present invention can also provide a bill payment function whenever the "bill payment" box of the FIG. 7 screen is activated. The screen of FIGS. 8, 9 and 10 are then displayed in sequence to confirm PIN authority. Upon selection of the bill payment function and valid PIN entry, the screen of FIG. 19 is shown, which indicates the prestored payees which can be selected, or "other" category by which additional payees can be entered. As shown by the screen of FIG. 20, upon selection of a prestored payee, the screen of FIG. 21 appears to provide entry of the amount to be paid. Upon data entry, the display is as shown in FIG. 22, where the amount entered and the name of the payee are shown. Thereafter, the prompt screens of FIGS. 13 and 14 are displayed, and the user is instructed thereby to select the phone number to be dialed. Upon selection thereof, the prompt screen of FIG. 23 appears as the portable automated teller machine is dialing the host bank computer to place the terminal on-line to transact the payment of the previously entered bill amount. Upon completion of the transaction, the screen displays of FIG. 24 and 25 are shown.

Figure 26:
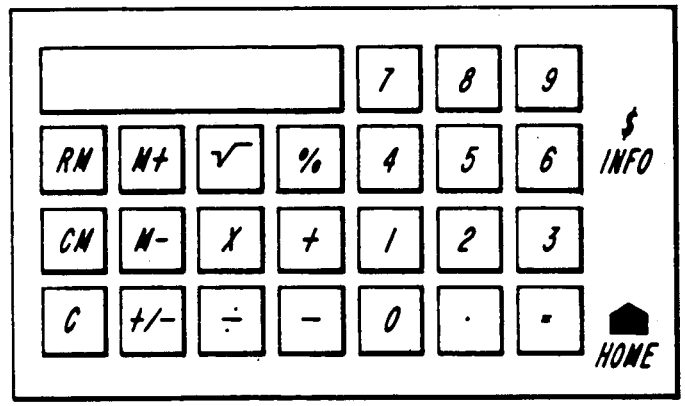
Figure 27:
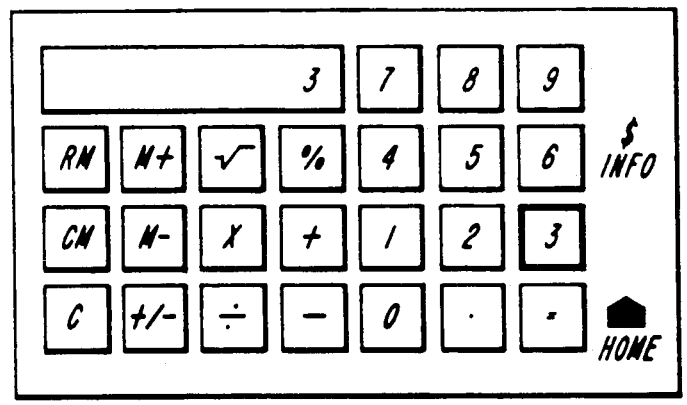

Selection of the "calculator" function of the FIG. 7 screen-form display results in the display of FIG. 26, which, as will be apparent, is a typical calculator keyboard and display for the usual calculator functions as shown in the display screen-form of FIG. 27. The results of a calculation can be stored in the scratch-pad memory.

The terminal operates in its on-line mode only when necessary to access and communicate with the remote computer. All other terminal functions are performed in its off-line mode, and without need for connection to the host bank computer, and without need for access to a telephone handset.

Figure 28:
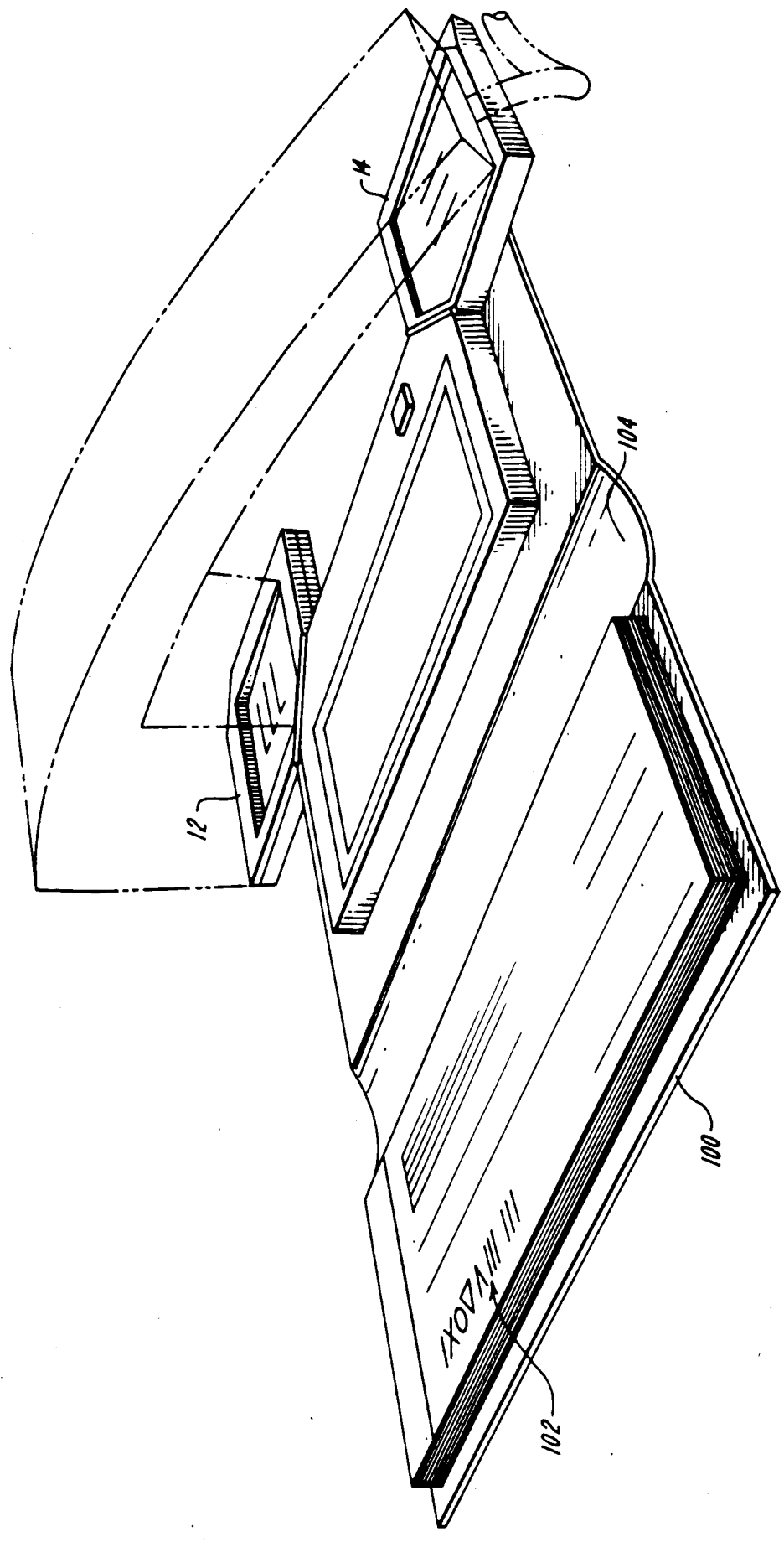
FIG. 28 is a perspective view of an alternative implementation of the portable automated teller machine in which the housing thereof includes a cover section for accommodating a checkbook.

An alternative embodiment is shown in FIG. 28 in which the terminal housing includes a flap 100 to which a checkbook 102 can be affixed and which is foldable over the folded ears 12 and 14 to provide a compact, portable and pocketable unit. The flap 100 can be integrally molded with the housing and is of a relatively thin plastic material having an integrally formed hinge 104 for folding of the checkbook portion.

Many modifications of the presently disclosed invention will become apparent to those skilled in the art without departing from the scope of the appended claims.

What is claimed is:

1. A portable, ultra-compact, and secure, automated teller machine, for transacting business with a bank via a bank host computer over the public telephone network, comprising:

a housing defining an extension in space and having a top face;

first and second transducers associated with said housing;

screen means mounted in the housing for displaying any one of a plurality of predetermined screen-forms at the top face of the housing;

selectively configurable means overlaying the screen means for enabling data and command entry to preselected different portions of the screen means in dependance on which one of the predetermined plurality of the screen-forms is being displayed on the screen means;

a single-chip integrated circuit mounted within said housing, said single-chip integrated circuit including:

a processor;

a first memory operatively connected to the processor as a ROM memory, the first memory having memory locations at which an on-line mode and an off-line mode are specified, at which the plurality of predetermined screen-forms are specified, and at which the selectively configurable means is specified in plural formats that respectively conform to the plurality of predetermined screen-forms to enable data and command entry to preselected different portions of the screen means;

a second memory operatively connected to the processor as an EEPROM memory, the second memory having memory locations at which a personal identification number is prestored, at which a machine identity number is prestored, at which at least one telephone number of a specific bank host computer is prestored, and at which at least one bank account number is prestored;

a third memory operatively coupled to the processor as a RAM memory, the third memory having memory locations at which set-up data is temporarily stored during operation in the off-line mode and from which the set-up data is transferred blockwise to the bank host computer during operation in the on-line mode, and having memory locations at which data supplied back by the bank host computer is temporarily stored for display on the screen means;

means including a tone generator coupled to the processor and to the first and second transducers for calling the bank host computer and for linking up over a telephone communication link with the same over the handset of any telephone station; and means including a data modem coupled to the processor and to the first and second transducers for transmitting the set-up data stored blockwise in said third memory means to the bank host computer over the telephone communication link in the on-line mode and for receiving data supplied back by the bank host computer in the on-line mode;

said processor is coupled to said screen means and to said selectively configurable means and is operative in the off-line mode to display a preselected screen-form selected to request entry of the personal identification number of the user and to correspondingly configure the selectively configurable means at the same time to enable entry directly on the screen means of a personal identification number, and is operative in the off-line mode to allow data set-up if and only if the entered personal identification number matches the personal identification number prestored in the second memory means, and upon the correct entry to the screen means of the personal identification number prestored in the second memory means, the processor is operative in the off-line mode to display at least one predetermined screen-form in a preselected sequence on said screen means, the at least one predetermined screen-form in a preselected display sequence being determined and selected to enable the user to set-up a block of set-up data in said third memory means representative of a transaction to be transacted with the bank host computer and representative of the machine identity number;

said processor is operative in the on-line mode upon having set-up the set-up data in the off-line mode representative of a transaction to be transacted with the bank host computer and representative of the machine identity number to call the bank host computer via the tone generator to link up over a telephone communication link with the same and to transfer the set-up data stored blockwise in the third memory means to the bank host computer via the data modem, said processor is operative in the on-line mode to receive data back from the host bank computer if and only if the machine identity number prestored in the second memory means and transferred as part of the set-up data matches a valid machine identity number at the bank host computer, and upon a correct match of machine identity numbers at the bank host computer, the processor is operative in the on-line mode once the transaction that's represented by that block of set-up data has been processed by the host bank computer to receive via the data modem data supplied back by the bank host computer representative of the status of the transaction and to store the same in the third memory means;

said processor is operative in response to having received via the data modem the data supplied by the bank host computer representative of the status of the transaction and stored in the third memory to disconnect from the telephone communication link, and to display the data supplied by the bank host computer and stored in the third memory means on said screen means in the off-line mode.

2. The invention of claim 1, wherein said single-chip integrated circuit further includes a fourth memory coupled to the processor as ROM memory, the fourth memory having memory locations at which a calculator function is specified, and wherein said processor is further operative in the off-line mode to provide a calculator screen-form via said screen means and to enable command and data entry to said calculator screen-form via said selectively configurable means.

3. The invention of claim 1, wherein said transaction is an account balance inquiry.

4. The invention of claim 3, wherein said account is a saving account.

5. The invention of claim 3, wherein said account is a checking account.

6. The invention of claim 1, wherein said transaction is an electronic funds transfer.

7. The invention of claim 1, wherein said single-chip integrated circuit further includes a fifth memory coupled to said processor as masked ROM, the fifth memory having memory locations at which a plurality of security encryption algorithms are specified, wherein said second memory further having memory locations at which a plurality of encryption keys are prestored, and wherein said processor is further operative in the on-line mode to transmit the set-up data blockwise using a selected encryption algorithm and key.

8. The invention of claim 7, wherein said encryption keys are DES encryption keys.

9. The invention of claim 1, further including a flap to which a checkbook can be affixed that is fastened to said housing.

10. The invention of claim 1, wherein said first and second transducers are first and second transducer ears, and further including means for mounting the transducer ears to the housing for movement between a folded condition and an unfolded condition, where the ears in their folded condition extend no more than the physical extension of the housing, and where the ears in their unfolded condition define a preselected physical extension selected to be larger than the extension of the housing and define a span between the ears in their unfolded condition that accepts the handset of any telephone set.

11. The invention of claim 10, wherein said ears are so angled as to correspond to the angles of the transducers of a telephone handset of any public telephone station.

12. The invention of claim 11, further including means mounted to said transducer ears to provide acoustical coupling with the telephone handset.

13. The invention of claim 10, wherein the housing has diagonal axes, and said transducer ears are pivotably mounted at respective diagonal axes.

14. The invention of claim 1, wherein said screen means includes a liquid crystal dot matrix display.

15. The invention of claim 1, wherein said selectively configurable means includes a touch sensitive matrix.

16. A machine for transacting business with a remote host computer, said machine being coupled to the remote host computer via a handset of any telephone station and is secured against unauthorized usage, comprising:
a housing;
I/O means mounted to said housing for enabling data and command entry and for displaying data and possible command selections;
memory means mounted to said housing for storing a predetermined personal identification number and a predetermined machine identity number at different memory locations; and
bi-modal means mounted to said housing and cooperative with said I/O means and responsive only to the predetermined personal identification number (PIN) entered via said I/O means for both allowing a block of data representative of a transaction to be transacted with the remote host computer to be set-up in the memory means via the I/O means in an off-line mode and for transmitting that block of data and including the predetermined machine identity number to the remote host computer via the handset of any telephone station in an on-line mode after the block of data has been set-up substantially completely in the off-line mode, and responsive only to the predetermined machine identity number (MIN) having been matched at the remote host computer for receiving data back from the remote host computer representative of the status of the transaction via the handset of any telephone station in the on-line mode and for displaying the data received back from the remote host computer representative of the status of the transaction via the I/O means again in an off-line mode.

17. The invention of claim 16, wherein said housing includes means for receiving the handset of any telephone station.

18. The invention of claim 17, wherein said receiving means includes first and second transducers, and means for mounting said first and second transducers to said housing.

19. The invention of claim 18, wherein said first and second transducers mounting means includes means for allowing said first and second transducers to pivotally move relative to said housing.

20. The invention of claim 16, wherein said bi-modal means is a single-chip integrated circuit.

21. The invention of claim 20, wherein said single-chip integrated circuit bi-modal means includes a processor, a tone generator and data modem coupled to said processor.

22. The invention of claim 21, wherein said I/O means includes a display screen and an overlayed touchscreen both coupled to said processor.

* * * * *